United States Patent [19]

Romey et al.

[11] 4,310,422

[45] Jan. 12, 1982

[54] METHOD OF PROCESSING AND RECIRCULATING FILTRATION RESIDUES

[75] Inventors: Ingo Romey, Hünxe; Reinhard Pass, Essen, both of Fed. Rep. of Germany

[73] Assignee: Bergwerksverband GmbH, Essen, Fed. Rep. of Germany

[21] Appl. No.: 233,103

[22] Filed: Feb. 10, 1981

[30] Foreign Application Priority Data

Feb. 13, 1980 [DE] Fed. Rep. of Germany ....... 3005246

[51] Int. Cl.³ .............................................. B01D 41/00
[52] U.S. Cl. .................................... 210/769; 210/771; 210/774; 210/777
[58] Field of Search ............... 210/769, 770, 771, 774, 210/777, 778, 791, 792, 173, 174, 193

[56] References Cited

U.S. PATENT DOCUMENTS

| | | | |
|---|---|---|---|
| 3,306,236 | 2/1967 | Campbell | 210/774 |
| 3,549,011 | 12/1970 | Marsh | 210/769 |
| 3,856,675 | 12/1974 | Sze | 210/774 |
| 3,870,632 | 3/1975 | Erskine | 210/769 |
| 4,046,690 | 9/1977 | Rodgers | 210/777 |
| 4,157,305 | 6/1979 | Muller | 210/771 |
| 4,193,206 | 3/1980 | Maffet | 210/769 |

FOREIGN PATENT DOCUMENTS 361983 1/1973 U.S.S.R. .............................. 210/770

Primary Examiner—Ernest G. Therkorn
Attorney, Agent, or Firm—Michael J. Striker

[57] ABSTRACT

The filter cake resulting from the filtration of tar, pitch, coal extract or coal oil with the help of a filter aid, is dried by blowing an inert gas through it. Thereafter it is comminuted to a particle size of about 0.5 mm and these particles are heated in a fluidized bed at the rate of 1000° C./min to a temperature of 500°–1200° C. There is obtained a size mix of swelled particles from which a fraction having a size of about 0.05–0.3 mm is segregated and recirculated to the filter as a filter aid. Particles having a size above or below the segregated fraction are thermally decomposed, as are gaseous and liquid products which are liberted during the thermal treatment in the fluidized bed.

4 Claims, 1 Drawing Figure

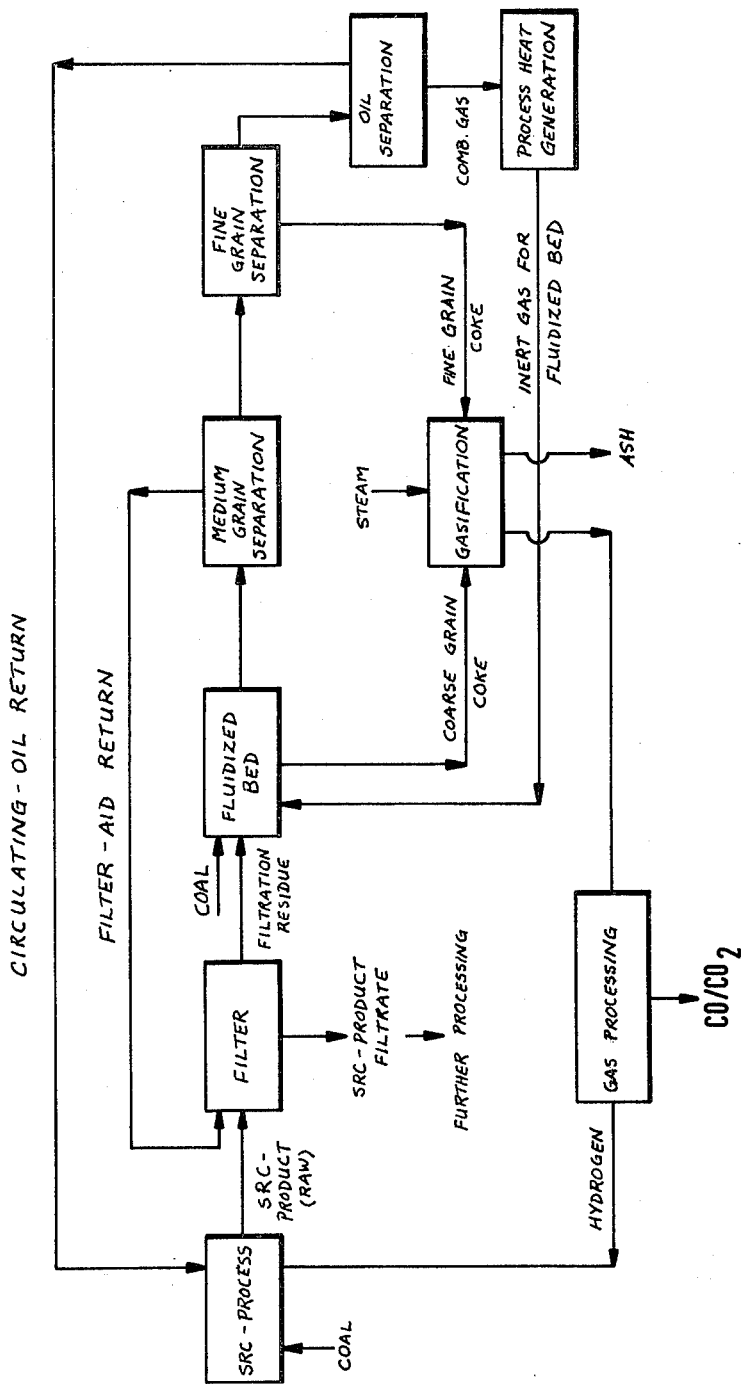

METHOD OF PROCESSING AND RECIRCULATING FILTRATION RESIDUES

BACKGROUND OF THE INVENTION

The present invention relates to a method for processing and recirculating filtration residues.

When tars, pitches, coal extracts and coal oils are filtered, it is known to improve filterability by employing a filter aid. This is deposited as an alluvial layer on the actual filter structure and/or it is constantly added in metered quantities to the substance to be filtered. In either case, it will form on the actual filter structure a layer through which the substance if filtered before it even encounters the actual filter structure per se.

In the course of continuing filtration, a filter cake (filter residue) builds up which is primarily composed of the filter aid, the filtered-out substances and any residual filtrate that clings to them. From time to time this filter cake is (in fact, must be) removed from the actual filter structure. Either prior to such removal, or subsequently thereto, it is customary to dry the filter cake to a certain extent by means of an inert gas, such as $N_2$ or hot steam. This reduces the amount of residual filtrate adhering to the filter cake and permits recovery of the portion which is driven off by the influence of the heat or gas.

Among the suitable filter aids are perlite, swelling clay and kieselguhr. Both of these, due to their particular structure, form a loose (as opposed to dense) filter cake, which assures high flow-through rates per unit time and a high degree of filtrant purity. Under actual process conditions it is customary to match the residue quantities to be removed by filtration, with the addition of similar quantities of filter aid. Another type of suitable filter aid is swelling or bubble coke; these have similarly advantageous characteristics as perlite, swelling clay and kieselguhr but are used preferentially for the filtration of alkaline media. These coke types are formed by subjecting finely ground bituminous products to sudden heating. During this thermal treatment the material passes through a softening phase; at the same time, gas evolution begins to take place. This gas expands (blows up) the individual granules to form a hollow, thin-walled product (bubble).

There are two major problems involved in the filtration of tars, pitches, coal extracts and coal oils: the quantities of (relatively expensive) filter aid which are needed are very substantial and little, if any, of the filter aid can be recovered for re-use. The other problem is what to do with the filter cake for which no reasonable use exists.

The latter problem could be dealt with according to a prior art proposal which suggests that the filtration residue should be simply combusted. However, this evidently does not solve the problem of providing large quantities of fresh filter aid for each filtration episode.

SUMMARY OF THE INVENTION

Accordingly, it is an object of the invention to overcome the disadvantages of the prior art.

A more particular object of the invention is to process the filtration residue resulting during the filtration of tars, pitches, coal extracts and coal oils with the help of a filter aid, and to recirculate it into the filtration process.

Another object is to produce, as part of the inventive method, a filter aid which is reusable in this method so that a circulation is established which reduces the need for fresh filter aid to a minimum, i.e., only to replacement quantities.

A concomitant object is to provide a method as set forth above, in which the filtration residue is subjected to further processing which requires relatively little energy expenditure and is environmentally sound.

Pursuant to these objects, and still others which will become apparent hereafter, one aspect of the invention resides in a method of recovering and reusing filtration residue which develops during filtering of tars, pitches, coal extracts and coal oil with the help of filter aids, comprising the steps of passing an inert gas about and through the filtration residue until the residue becomes sufficiently dry to permit comminution; comminuting the dried residue to a particle size of about 0.5 mm; heating the comminuted residue particles in a fluidized bed to a temperature between about 500°–1200° C. at a heating rate of 1000° C./minute to thereby obtain a mix of expanded particles of different sizes; segregating from the mix a fraction containing particles in the size range of substantially 0.05–0.3 mm; and using the thus segregated fraction as a filter aid in the filtration of tars, pitches, coal extracts and coal oil.

As already mentioned, $N_2$ and hot steam are among the suitable inert gases. Hot steam is currently preferred, because of its extractive effect upon the volatile components of the filter cake. This results in a filter cake which in cold condition is relatively hard and contains a residual quantity of bituminous substances which as a rule is smaller than 30%. In any case, however, at least after having been flushed with inert gas at room temperature the filter cake is to have a solids component greater than 40%, preferably greater than 50%.

Such filtration residue softens when subjected to heat and can be converted to small particles by extruding and granulation; this is especially advantageous for processing of filtration residue from coal extracts and coal oils. If the filtration residue is derived from the filtration of tar and/or pitch, then a small quantity of cold inert gas will, as a rule, be sufficient since the resulting cooling rapidly produces a hard, brittle residue which can be ground or otherwise processed.

It is clear, from what has been stated thus far, that the drying (flushing) process with inert gas is essentially carried on as in the prior art. An essential difference is, however, that in the prior art the filtration residue (filter cake) is of gluey or pasty consistency, whereas according to the invention the dried residue must be such that it can be comminuted into particulate form.

The comminution may be carried out in different ways, e.g., by actual grinding or by granulation. In any case, however, there will as a rule develop a size spectrum of differently sized particles; the only requirement that is made in this connection in terms of the invention, is that the main proportion of the particles have a size of about 0.5 mm. The limits of the size spectrum may be within the conventional technical boundaries; generally, a larger proportion of smaller particles is obtained than of larger ones.

The thus obtained particulate residue is then subjected to shock-like coking in a fluidized bed. Tests have shown that in order for the recirculation of the processed particles within the filtration process to be feasible, the heating speed in the fluidized bed must be at least 1000° C./min; the final temperatures obtained by processing the particles in this manner should be between about 500° C. and 1200° C. The final temperature depends upon the temperature at which the heated-up filtration residue will harden again to form a coke lattice. This temperature range is important, because the desired result cannot as a rule be achieved below 500° C., whereas temperatures above 1200° C. offer no additional advantages and, if anything, tend to create problems. No special requirements are made of the fluidized bed treatment, other than the aforementioned temperature considerations; in all other respects, the fluidized bed is in accordance with the known-per-se state of the art.

When thermally treated at the aforementioned temperatures in the fluidized bed, the bituminous components of the filtration residue soften and a high degree of gas evolution takes place. This causes swelling or expansion, so that swelling coke of various particle sizes is produced. Rather surprisingly, this swelling coke has the type of structure needed as a filter aid for use in the filtration of tars, pitches, coal extracts and coal oil.

However, it has been found that it is not possible to use the swelling coke in the particle size mix which is produced in the fluidized bed. Instead, a particle size fraction within the range of substantially 0.05 to 0.3 mm must be selected from among the overall particle mix, in order to be able to successfully filter tars, pitches coal extracts and coal oils using the recirculated and processed filtration residue (i.e., now converted to swelling coke) as filter aid. Of course, a certain size range is permissible within the selected fraction, i.e., certain quantities of particles which are respectively smaller and larger than the selected fraction. The removal of this fraction from the overall particle mix can be effected in various ways, e.g., with the aid of a cyclone arranged downstream of the fluidized bed. Then again, it is possible to remove a coarse particle fraction with particles which are primarily larger than 0.3 mm, at the bottom of the fluidized bed reactor, and to withdraw the smaller-size fractions at the head (top) of the reactor and derive from them the inventive fraction by air classification or in a cyclone.

The thus obtained particle fraction is then used as a filter aid in quantities and in the manner known from the art.

It should be understood that the method according to the invention is not limited to certain types of tars, pitches, coal extracts or coal oils, nor to use with particular types of filtration apparatus or filters. The invention can be carried out particularly successfully if the particle size fractions which are smaller and coarser than the selected size fraction, are thermally decomposed by e.g., gasification or combustion. Depending upon the chemical composition of the particles of these fractions this yield process heat for e.g., the thermal treatment, or else an e.g., hydrogen-containing user gas. In either case, maximum economic benefit is derived from material which has heretofore been thrown away.

When the comminuted particles of the filter cake are thermally treated in the fluidized bed, liquid and gaseous products are incidentally liberated from them. It is particularly advantageous if these products are either recovered for further use (e.g., as so-called circulating oil in coal liquefaction) or else are also thermally decomposed. In the latter instance, further process heat is made available to produce, e.g., a hot combustion gas for operation of the fluidized bed reactor.

The operation of the inventive method becomes particularly adaptable if, in accordance with another aspect of the invention, the comminuted filter cake has admixed to it between 20–45% by weight of a type of coal having a volatiles content greater than 25% (related to water-and ash-free coal) and a particle size approximately the same as that of the comminuted filter cake. This has several advantages. It permits replenishment of those particle sizes which are not recirculated into the filtration process, so that there will always be an adequate quantity of filter aid available. On the other hand, the quantities of segregated-out particles sizes (i.e., those which are too small or too large) are enlarged by correspondingly sized particles from the admixed coal, thus increasing their quantities to the point where their further processing—e.g., by gasification or combustion—is economically worthwhile. The same is true, of course, with respect to the liquid and gaseous products which are liberated during thermal treatment in the fluidized bed. It is felt to be quite surprising that this admixing step produces a filter aid the overall effectiveness of which corresponds essentially to the effectiveness of filter aid obtained directly from the comminuted filter cake without such admixture. Moreover, rather astonishingly the cokeable carbonaceous material suitable for this admixture need not meet any specific requirements other than those mentioned above. Thus, various different kinds of coal can be used, as well as other cokeable carbonaceous materials.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a flow diagram, illustrating the individual process steps according to the invention.

DESCRIPTION OF THE PREFERRED EMBODIMENTS

The substance to be filtered, e.g., coal oil obtained in an SRC (solvent-refined coal) process, is supplied to a filter where it undergoes filtration. The (SRC product) filtrate is removed for further processing. The filtration residue (filter cake) is admitted into a fluidized bed in a fluidized bed reactor (known per se); if desired, stone coal, or another cokeable carbonaceous material having a volatile content greater than 25% (related to water-and-ash-free coal) may be added to the residue prior to entry into the fluidized bed.

In the fluidized bed the residue (and added carbonaceous material, if any) undergoes shock-like heating to 500°–1200° C., being heated at a rate of 1000° C./min. This results in the formation of swelling coke of various particle sizes. A coarse particle fraction, essentially larger than 0.3 mm, can be withdrawn at the bottom of the fluidized bed. All smaller particles leave the fluidized bed reactor at the top thereof and pass to an intermediate station (e.g., cyclone) where the medium-size particle fraction is removed from them, i.e., particles in the size range of about 0.05 and 0.3 mm. These are recirculated directly into the filter as the inventive filter aid.

The remaining particles pass to still another station for fine particle separation and from there are fed to a gasification reactor (or burner) to which the coarse fraction from the fluidized bed is also admitted. Oil and gas obtained from these particles can also be further processed as illustrated, for example to generate process heat or, in the case of the oil, to be returned to the SCR-process stage.

For a better understanding, the invention will now be described with reference to certain examples.

EXAMPLE 1

1. Coal was subjected to an SRC-process treatment at 430° C. and at 140 bar pressure. The coal was composed of 8.4% ash, and 37% volatiles; about 3% hydrogen were added by weight of the coal. The product thus obtained (coal oil with 7% by weight of substances insoluble in Quinoline) was mixed with 5% by weight of a filter aid composed of swelling coke with 6.8% by weight of ash and a particle size distribution of 24% smaller than 0.05 mm and 20% larger than 0.3 mm. The mixture was passed through a gap filter having filter gaps of 0.1 mm width, at a temperature of 200° C. and a pressure of 5 bar. The surface area of the gap filter was 0.2 m² and an average filtration result was obtained of 308 liter of filtrate/m² filter surface area/hour and a purity of 0.025% of substances insoluble in Quinoline. Filtration was continued until a filter cake had formed on the gap filter of about 12 Kg filter aid/m² of filter surface area. At that time, filtration was interrupted to permit removal of the filter cake.

The filter aid which was needed to start up the filtration process, was produced by comminuting coal of the type mentioned earlier herein, to produce particles of about 0.5 mm size. These particles were then introduced into a known-per-se fluidized bed reactor where they underwent shock-like heating to 800° C. at a heating rate of 1000° C./min. This produced swelling coke of a varying particle-size mix. From this mix, a particle fraction of essentially 0.05 mm to 0.3 mm was removed by passing the mix through cyclones and this fraction was used as the filter aid in the above-described manner. The pouring weight of the particles of this fraction was 420 kg/m³.

2. The filtration residue (filter cake) which was formed on the filter when operation was interrupted, was soft and sticky and found to have a residual oil content of 70% by weight at 200° C. Steam at 300° C. temperature was blown through it while still in the filter housing until the residual oil content dropped to 30% by weight. When the thus dried filter cake was removed 3. The filter cake obtained in step (2) was comminuted to a particle size of about 0.5 mm and these particles were introduced, in a quantity of 10 kg/h, into a known-per-se fluidized bed reactor which was operated with hot combustion gases of 1100° C. temperature at a gas flow speed of 0.2 m/sec. The admission of gas into the reactor was so selected that the particles were heated up at a rate of 1000° C./min. whereby thermal conversion of the particles into swelling coke particles took place in the fluidized bed.

4. The entire swelling coke output of the fluidized bed reactor was passed out of the reactor to several cyclones, where it was segregated into three particle fractions of which the middle one had particles ranging between essentially 0.05 and 0.3 mm. The particle size distribution of this particular fraction was:

15% > 0.3 μm
55% > 0.1 μm
80% > 0.05 μm

When a sufficient quantity of this particle fraction had thus been produced, it was employed in step (1) in lieu of the originally used swelling coke as the filter aid. The filter cake which then resulted was again processed in accordance with steps 2–4 to obtain further filter aid.

EXAMPLE 2

This Example was carried out in a manner identical to that described above for Example 1. The only exception was that the comminuted, dry filter cake was mixed (before introduction into the fluidized bed) with stone coal ground to about 0.5 mm particle size (coal composition 8.4% ash, 37% volatiles) in an amount of 38% by weight related to filter cake treated with inert gas. The comminuted filter cake and coal were then jointly processed in the manner described for Example 1.

The characteristics and capabilities of filter aid produced from this mixture are not essentially different from those obtained in Example 1. Only the ash content and the quantitative composition of the three particle fractions obtained, differed slightly from Example 1. Also, in Example 2 there was constantly a certain excess amount of filter aid available.

The table shows the results of the first three runs.

EXAMPLE 3

This Example was carried out for comparison purposes, to determine whether the filtration results obtainable with a filter aid produced according to the invention would or would not differ from the results obtained when using a conventional, known-per-se filter aid such as perlite or kieselguhr.

| | | Filtration | | | | Manufacturing of Filteraid | | | | |
|---|---|---|---|---|---|---|---|---|---|---|
| | Filteraid | Filter-Rate | Composition Filter Cake | | | Addition | Composition of the Product | | | |
| | | | | | | | Fraction 0.05–0.3 mm | | Fraction <0.05;>0.3mm | |
| Run | F.A. | l/m²h | Oil | Ash | F.A._af_ | of Coal | Amount | Ash | Amount | Ash | Oil + Gas |
| 1 | Low Temperature Coke 6.8% Ash | 308 | 30 | 28 | 42 | 38 | 42 | 11.4% | 87 | 31.5% | 9 |
| 2 | Filteraid from Run 1 11.4% Ash | 290 | 30 | 30.7 | 39.3 | 39 | 42 | 11.1% | 85 | 33.2% | 12 |
| 3 | Filteraid from Run 2 11.1% Ash | 305 | 30 | 30.4 | 39.6 | 39.3 | 42 | 11.1% | 84.5 | 33% | 12.5 |

_af_ = ash free
Filter Cake = 100 from the filter housing at a temperature of 100° C., it was found to be dry and slightly friable.

The operation and process conditions were the same as in Example 1, except that in place of the inventive filter aid and its manner of making, a conventional perlite-based filter aid was used. The filter cake was simply burned. The average filtration rate was 333 liter/m²h.

The filter aid composition (100 g/l pouring weight) was
- 75.0%—$SiO_2$
- 13.5%—$Al_2O_3$ Particle size distribution was
- 99% > 0.1 μm
- 93% > 0.05 μm
- 100% > 0.3 μm It was concluded that there were no major differences in the effectiveness of filtration between the inventive filter aid and the known ones on perlite or kieselguhr basis.

The invention, however, makes it possible to effectively utilize the filter cake which under technical process conditions is available in large quantities. At the same time it assures that a filter aid suitable for the filtration of tars, pitches, coal extracts and coal oils is always available in sizable quantities. And last, but not least, the invention recovers portions of the product being filtered which heretofore were discarded with the filter cake, and provides an economically valuable use for the filter cake (even those portions thereof which are not suitable for use as the filter aid) which heretofore was discarded as useless.

While the invention has been illustrated and described as embodied in a filter aid preparation process, it is not inted to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is new and desired to be protected by Letters Patent is set forth in the appended claims.

We claim:

1. A method of recovering and reusing filtration residue which develops during filtering of tars, pitches, coal extracts and coal oil with the help of filter aids, comprising the steps of passing an inert gas about and through the filtration residue until the residue becomes sufficiently dry to permit comminution; comminuting the dried residue to a particle size of about 0.5 mm; heating the comminuted residue particles in a fluidized bed to a temperature between about 500°–1200° C. at a heating rate of 1000° C./minute to thereby obtain a mix of expanded particles of different sizes; segregating from said mix a fraction containing particles in the size range of substantially 0.05–0.3 mm; and using the thus segregated fraction as a filter aid in the filtration of tars, pitches, coal extracts and coal oil.

2. A method as defined in claim 1; and further comprising the step of thermally decomposing the mix which remains after segregation of said fraction.

3. A method as defined in claim 1, wherein liquid and gaseous products are liberated during heating of said particles in said fluidized bed; and further comprising the step of thermally decomposing the thus liberated liquid and gaseous products.

4. A method as defined in claim 1; and further comprising the step of admixing the comminuted dried residue prior to the step of heating with between 20–45% by weight of a cokeable carbonaceous substance containing in excess of 25% volatiles as related to water- and-ash-free coal, and having a particle size substantially the same as that of said comminuted dried residue.

* * * * *